US008832135B2

(12) United States Patent
Shapira et al.

(10) Patent No.: US 8,832,135 B2
(45) Date of Patent: Sep. 9, 2014

(54) METHOD AND SYSTEM FOR DATABASE QUERY TERM SUGGESTION

(75) Inventors: Ido Shapira, Tel Aviv (IL); Michael Brand, Parkdale (AU); Sagi Nachum, Modiin (IL); Ofer Shochet, Tel-Aviv (IL); Galia Zacay, Givat Shmuel (IL)

(73) Assignee: Verint Systems, Ltd., Herzliya (IL)

( * ) Notice: Subject to any disclaimer, the term of this patent is extended or adjusted under 35 U.S.C. 154(b) by 389 days.

(21) Appl. No.: 12/164,480

(22) Filed: Jun. 30, 2008

(65) Prior Publication Data

US 2009/0276417 A1  Nov. 5, 2009

Related U.S. Application Data

(60) Provisional application No. 61/050,047, filed on May 2, 2008.

(51) Int. Cl.
*G06F 17/30* (2006.01)
*G06F 7/00* (2006.01)

(52) U.S. Cl.
CPC .... *G06F 17/30746* (2013.01); *G06F 17/30749* (2013.01); *G06F 17/30755* (2013.01)
USPC ........ 707/767; 707/769; 707/771; 379/88.14; 379/93.15

(58) Field of Classification Search
CPC .................... G06F 17/30389; G06F 17/30637; G06F 17/30672; G06F 17/30746; G06F 17/3064; G06F 3/0237; G06F 17/276; G06F 17/30755
See application file for complete search history.

(56) References Cited

U.S. PATENT DOCUMENTS

| | | | |
|---|---|---|---|
| 6,243,713 B1* | 6/2001 | Nelson et al. | 1/1 |
| 6,564,213 B1 | 5/2003 | Ortega et al. | |
| 6,701,309 B1* | 3/2004 | Beeferman et al. | 1/1 |
| 6,732,088 B1* | 5/2004 | Glance | 1/1 |
| 7,191,119 B2 | 3/2007 | Epstein et al. | |
| 7,499,940 B1* | 3/2009 | Gibbs | 1/1 |

(Continued)

FOREIGN PATENT DOCUMENTS

| | | |
|---|---|---|
| WO | 0180079 A | 10/2001 |
| WO | 2004114062 A2 | 12/2004 |

OTHER PUBLICATIONS

Method and System for Auto-Completion and Execution of Commands, IP.com Journal, IP.com Inc., Apr. 23, 2008, West Henrietta, N.Y., USA.

(Continued)

*Primary Examiner* — Alicia Lewis
(74) *Attorney, Agent, or Firm* — Meunier Carlin & Curfman (57) ABSTRACT

A method for automatically providing a plurality of additional database query terms comprising receiving a first query term from a user, receiving a plurality of characters from the user, wherein the plurality of characters is only a portion of a second query term, and selecting a set of records from a database based on the query term, wherein the database comprises records which comprise text translated from audio. The method also determines a plurality of additional query terms based on the plurality of characters, and, for at least one of the plurality of additional query terms, processes at least a portion of the set of records to determine a relevance of the additional query term. Finally, the method includes displaying at least one of the plurality of additional query terms to the user for selection based on the relevance of at least one of the plurality of additional query terms.

17 Claims, 5 Drawing Sheets

(56) References Cited

U.S. PATENT DOCUMENTS

| | | | |
|---|---|---|---|
| 7,720,792 B2* | 5/2010 | Price | 707/739 |
| 2002/0143548 A1* | 10/2002 | Korall et al. | 704/270 |
| 2003/0128820 A1* | 7/2003 | Hirschberg et al. | 379/88.14 |
| 2004/0039988 A1 | 2/2004 | Lee et al. | |
| 2004/0254928 A1 | 12/2004 | Vronay et al. | |
| 2005/0055213 A1* | 3/2005 | Claudatos et al. | 704/270.1 |
| 2005/0203878 A1* | 9/2005 | Brill et al. | 707/3 |
| 2005/0283468 A1 | 12/2005 | Kamvar et al. | |
| 2006/0184526 A1* | 8/2006 | Bossemeyer et al. | 707/6 |
| 2006/0190436 A1 | 8/2006 | Richardson et al. | |
| 2006/0248078 A1* | 11/2006 | Gross et al. | 707/5 |
| 2006/0253427 A1 | 11/2006 | Wu et al. | |
| 2006/0259479 A1 | 11/2006 | Dai | |
| 2007/0027864 A1* | 2/2007 | Collins et al. | 707/5 |
| 2007/0100795 A1* | 5/2007 | Davies | 707/3 |
| 2007/0143262 A1 | 6/2007 | Kasperski | |
| 2008/0021710 A1* | 1/2008 | Ho | 704/270.1 |
| 2008/0074493 A1 | 3/2008 | Laughlin | |

OTHER PUBLICATIONS

Jones, Rosie et al., "Generating Query Substitutions", World Wide Web Conference Committee (IW3C2), 2006, 10 pages.

Bast, Holger et al., "Type Less, Find More: Fast Autocompletion Search with a Succinct Index", Max-Planck-Institut fur Informatik, 2006, 8 pages, Saarbrucken, Germany.

* cited by examiner

METHOD AND SYSTEM FOR DATABASE QUERY TERM SUGGESTION

RELATED APPLICATIONS

This application hereby claims the benefit of and priority to U.S. Provisional Patent Application 61/050,047, titled "METHOD AND SYSTEM FOR DATABASE QUERY TERM SUGGESTION", filed on May 2, 2008, and which is hereby incorporated by reference in its entirety.

TECHNICAL FIELD

This invention is related to the field of database queries, and more specifically to the suggestion of additional database query terms to a user, where the database comprises a plurality of records, and the records comprise text translated from audio.

TECHNICAL BACKGROUND

Operations such as contact centers may generate large databases of records containing text translated from audio data. For example, a contact center may record each call initiated or received by the contact center for later analysis. Typically, these recordings are translated from audio data to text data for storage and retrieval as records in a database.

Database queries are used to access sets of records from the database, based on one or more query terms within the database queries. Commonly, a user enters a plurality of query terms into a user interface for the database system. For complex queries containing a large number of terms this task may be complicated and difficult. Also, users unfamiliar with the contents of the database may enter a query term without realizing that the use of other related query terms may improve the quality and quantity of the set of records retrieved from the database.

Overview

In an embodiment, a method for automatically providing a plurality of additional database query terms to a user is provided. The method comprises receiving a query term from a user, receiving a plurality of characters from the user in addition to the query term, and selecting a set of records from a database based on the query term, wherein the database comprises records, and the records comprise text translated from audio. The method also determines a plurality of additional query terms based on the plurality of characters, and, for at least one of the plurality of additional query terms, processes at least a portion of the set of records to determine a relevance of the additional query term. Finally, the method includes displaying at least one of the plurality of additional query terms to the user for selection, the display based on the relevance of the at least one of the plurality of additional query terms.

In some embodiments, the method also comprises displaying the relevance of the at least one of the plurality of additional query terms to the user.

In other embodiments, at least one of the plurality of additional query terms includes a query operator.

In still other embodiments, at least one of the plurality of additional query terms includes one or more words prepended to the plurality of characters.

In further embodiments, the relevance is determined at least in part based on statistical information related to the set of records.

In other embodiments, the relevance is determined at least in part based on syntactic information related to the set of records.

In still other embodiments, the relevance is determined at least in part based on semantic information related to the set of records.

In yet other embodiments, the relevance is determined at least in part based on a confidence level of a translation from audio to text of at least one word in the set of records.

In further embodiments, at least one of the plurality of additional query terms includes a synonym.

In still further embodiments, at least one of the plurality of additional query terms includes a stemming variation.

In yet other embodiments, at least one of the plurality of additional query terms includes at least one word similar in sound to at least one word in the query terms or in the plurality of additional query terms.

In some embodiments, at least one of the plurality of additional query terms is determined at least in part based on a semantic network.

In other embodiments, at least one of the plurality of additional query terms is selected from an existing list of query terms.

In still other embodiments, at least one of the plurality of additional query terms is selected from records within the database.

In further embodiments, the method further comprises reducing the relevance of at least one of the plurality of additional query terms contained in a stop list.

In still further embodiments, displaying the at least one of the plurality of additional query terms to the user includes displaying the at least one of the plurality of additional query terms in an order of relevance.

In another embodiment, a computer-readable medium having instructions stored thereon for operating a computer system to automatically provide a plurality of additional database query terms to a user is provided. The instructions, when executed by the computer system, direct the computer system to receive a query term from a user, receive a plurality of characters from the user in addition to the query term, and select a set of records from a database based on the query term, wherein the database comprises records, and the records comprise text translated from audio. The instructions further direct the computer system to determine a plurality of additional query terms based on the plurality of characters, and, for at least one of the plurality of additional query terms, process at least a portion of the set of records to determine a relevance of the additional query term. The instructions also direct the computer system to display at least one of the plurality of additional query terms to the user for selection, the display based on the relevance of the at least one of the plurality of additional query terms.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

A user enters query terms in an interface to search a database. When the user has entered at least one term and has started to enter an additional term, the computer system controlling the interface suggests a quantity of additional query terms for the partially entered term. These additional query terms may be ranked or sorted based on the relevance of one or more of the additional query terms to the results of a database search based on the query term that the user has already entered. Current database query auto-completion does not consider the relevance of the suggested terms to the current search. By determining the relevance of the suggested additional query terms to the results of the database search, the method provides the user with the most relevant suggestions, while avoiding irrelevant query terms.

The suggested additional query terms may be determined using any of a wide variety of methods, and their relevance to the results of the first database query may be based on any of a number of factors such as the frequency of their occurrence in the records resulting from a database search based on the query term that the user has already entered. By using relevance, the query term suggestion method is able to make valuable suggestions for novel queries, including queries that have not been previously run on the database interface.

Figure 1:
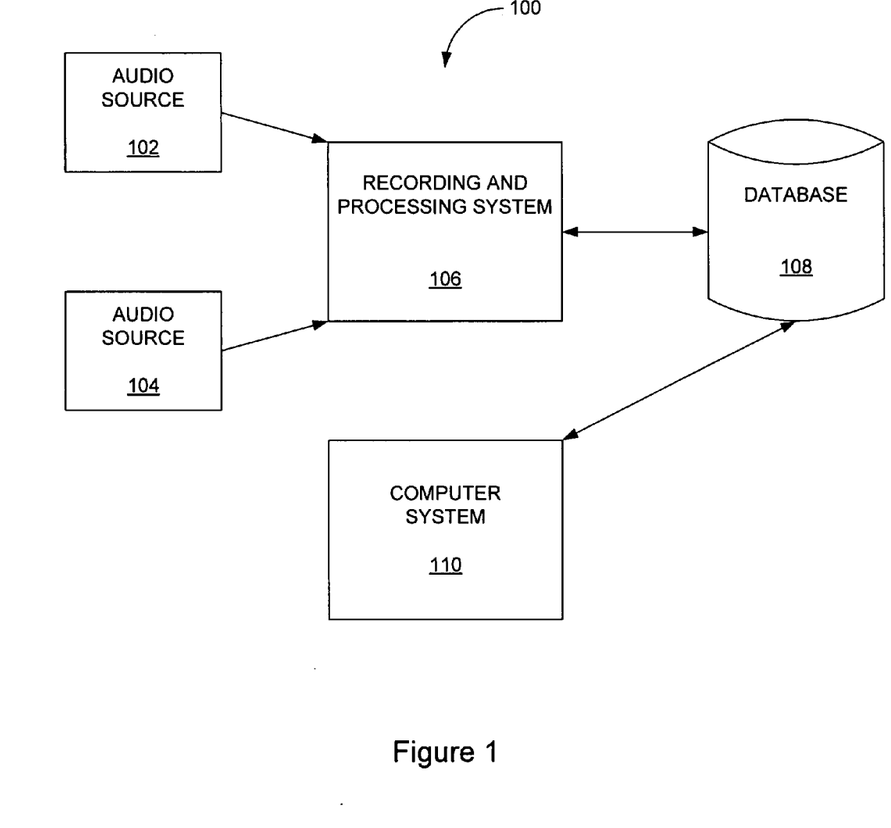
FIG. 1 is a block diagram illustrating a system for automatically providing a plurality of additional database query terms to a user.
Figure 3:
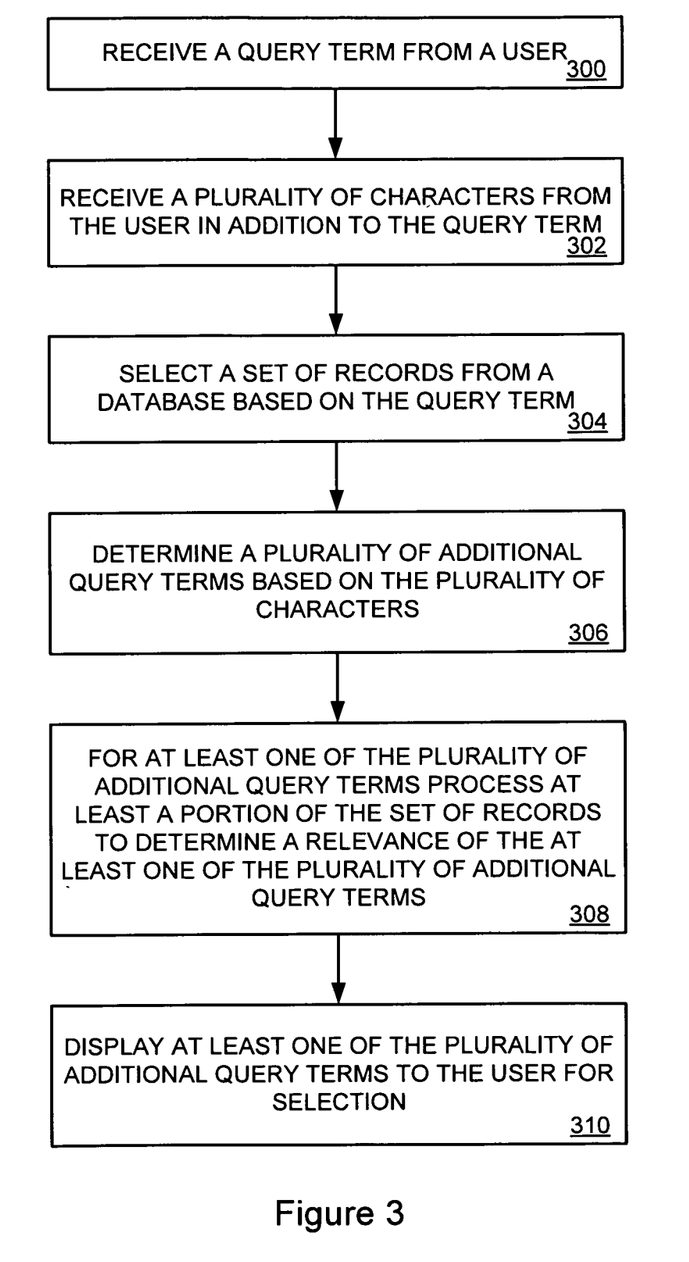
FIG. 3 is a flow diagram illustrating a method for automatically providing a plurality of additional database query terms to a user.
Figure 4:
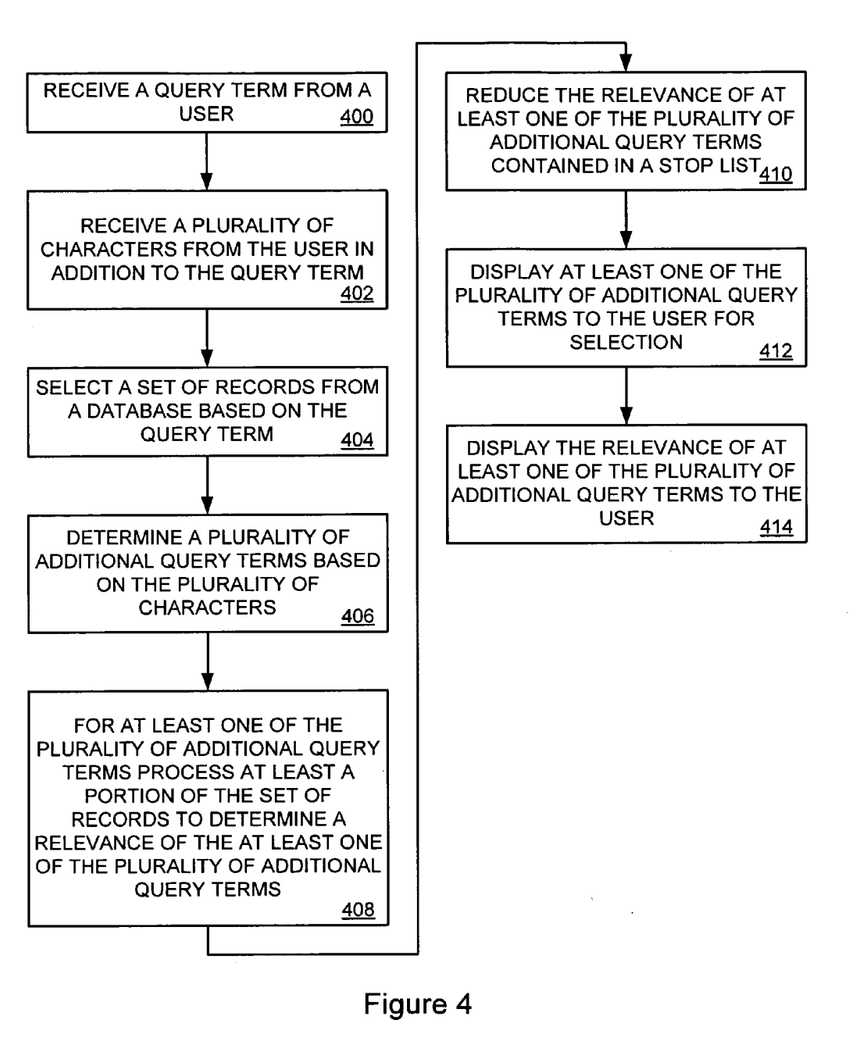
FIG. 4 is a flow diagram illustrating a method for automatically providing a plurality of additional database query terms to a user.
Figure 5:
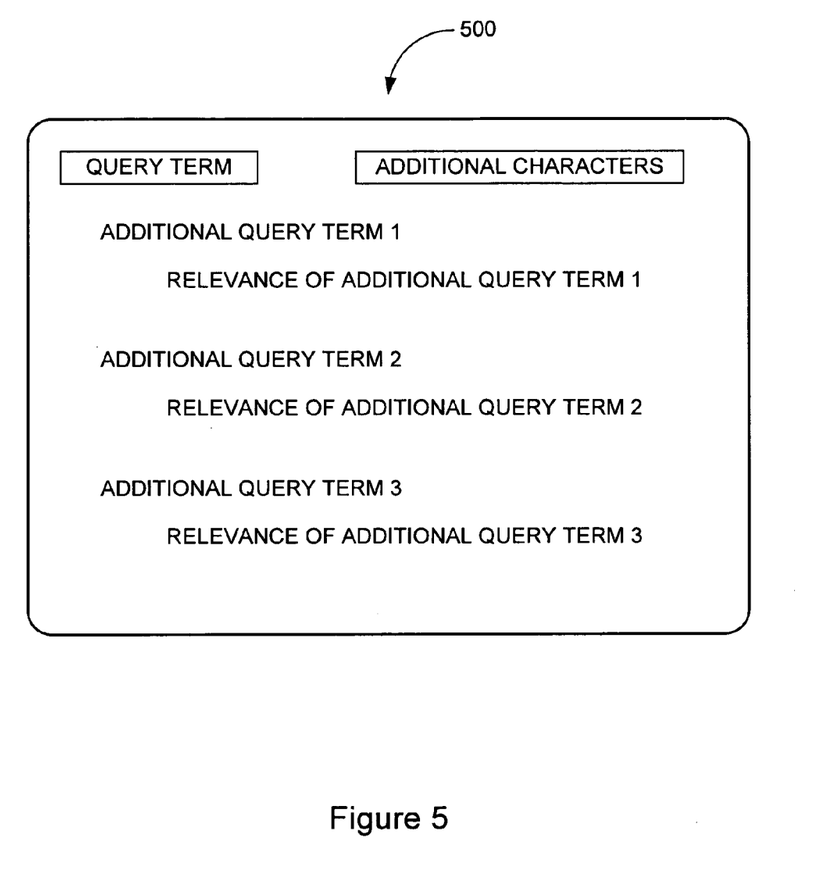
FIG. 5 is an illustration of a user interface in a system for automatically providing a plurality of additional database query terms to a user.

FIG. 1 is a block diagram illustrating a system for automatically providing a plurality of additional database query terms to a user. This example system 100 includes audio source 102, audio source 104, recording and processing system 106, database 108, and computer system 110. Audio sources 102 and 104 are configured to send audio data to recording and processing system 106. This audio data may take any of a very wide variety of formats, including both analog and digital audio formats. Recording and processing system 106 receives audio data from audio sources 102 and 104, translates the audio data to text data, and stores the text data (in the format of records) in database 108. Recording and processing system 106 may optionally assign a confidence factor to each word translated from audio to text and store the confidence factors with the text data on database 108. Confidence factors are estimates of the accuracy of the translation of a word or phrase from audio data to text data. Computer system 110 is coupled with database 108 and is configured to perform searches and analysis of the text contained in records in database 108. This functionality is illustrated in FIGS. 3-5 and described in further detail below.

The methods, systems, devices, databases, and servers described herein may be implemented with, contain, or be executed by one or more computer systems. The methods described herein may also be stored on a computer readable medium. Many of the elements of system 100 may be, comprise, or include computer systems. This includes, but is not limited to audio source 102, audio source 104, recording and processing system 106, database 108, and computer system 110. These computer systems are illustrated, by way of example, in FIG. 2.

Figure 2:
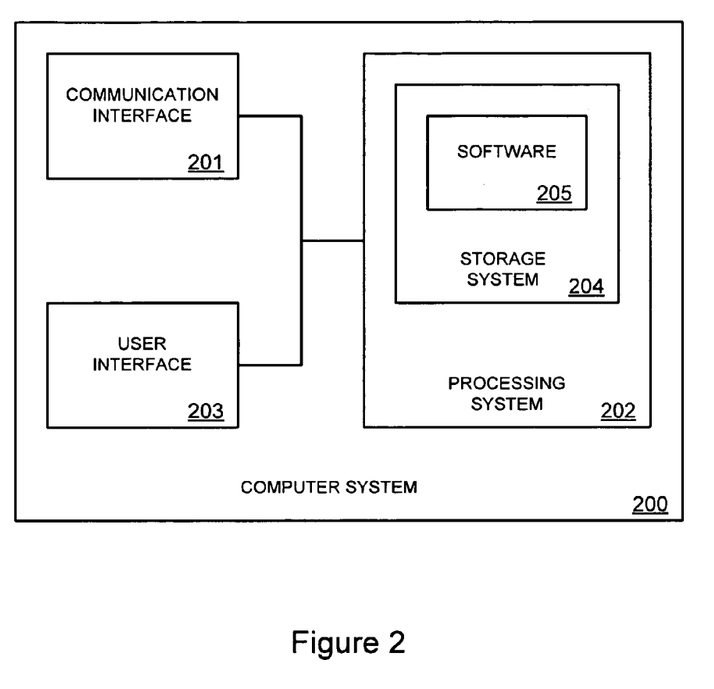
FIG. 2 is block diagram illustrating a computer system configured to automatically provide a plurality of additional database query terms to a user.

FIG. 2 is a block diagram illustrating a computer system configured to automatically provide a plurality of additional database query terms to a user. Computer system 200 includes communication interface 201, processing system 202, and user interface 203. Processing system 202 includes storage system 204. Storage system 204 stores software 205. Processing system 202 is linked to communication interface 201 and user interface 203. Computer system 200 could be comprised of a programmed general-purpose computer, although those skilled in the art will appreciate that programmable or special purpose circuitry and equipment may be used. Computer system 200 may be distributed among multiple devices that together comprise elements 201-205.

Communication interface 201 could comprise a network interface, modem, port, transceiver, or some other communication device. Communication interface 201 may be distributed among multiple communication devices. Processing system 202 could comprise a computer microprocessor, logic circuit, or some other processing device. Processing system 202 may be distributed among multiple processing devices. User interface 203 could comprise a keyboard, mouse, voice recognition interface, microphone and speakers, graphical display, touch screen, or some other type of user device. User interface 203 may be distributed among multiple user devices. Storage system 204 could comprise a disk, tape, integrated circuit, server, or some other memory device. Storage system 204 may be distributed among multiple memory devices.

Processing system 202 retrieves and executes software 205 from storage system 204. Software 205 may comprise an operating system, utilities, drivers, networking software, and other software typically loaded onto a computer system. Software 205 could comprise an application program, firmware, or some other form of machine-readable processing instructions. When executed by processing system 202, software 205 directs processing system 202 to operate as described herein.

FIG. 3 is a flow diagram illustrating a method for automatically providing a plurality of additional database query terms to a user. Reference numbers from FIG. 3 are indicated parenthetically below. In this example, computer system 110 receives a query term from a user, (operation 300). Each record in the database comprises text data translated from audio data, such as from calls recorded by a contact center. Records may also include metadata, such as the date, time, and location of the call, the identities of the parties to the call, along with a wide variety of other information.

Database queries may include a wide variety of formats. A query may comprise a single word, such as "credit", or a phrase, such as "credit card." Queries may also contain query operators, such as "credit NEAR card", "credit AND card", or the like. A query may include more complex query operators such as "credit WITHIN 5 OF card" which would find all instances of the word "credit" appearing within 5 words of "card", or "credit NOTIN 'credit card'" which would find all instances of the word "credit" other than those contained in the phrase "credit card." Terms may also include elements such as the time within the call where the word or words appear. For example, a term may be defined to search for a phrase, but limit the search to calls where the phrase only occurs in the first minute of the call. Query terms may also be weighted by their importance, or may be given negative weights as terms to avoid. In some embodiments, records containing "avoid" terms are removed from the set of records retrieved by the database query. Many complex terms may be formed and used within a database query. Also, a query may contain a list of tagged records that must be included in the results, or a list of tagged records that must not be included in the results.

Computer system 110 then receives a plurality of characters from the user in addition to the query term, (operation 302). These additional characters may be the start of an additional query term that the user intends to use in searching the database. For example, if the user intends to enter the query term "credit WITHIN 5 OF card" the user starts by entering the characters "cre" into the system. Computer system 110 then uses these initial characters to suggest additional query terms (in other operations described below), ideally including "credit WITHIN 5 OF card" to the user for selection.

Computer system 110 then selects a set of records from database 108 based on the database query, (operation 304). This selection may take a variety of forms. For example, computer system 110 may retrieve header information for each of the records, or it may retrieve each of the set of records for review by the user.

Computer system 110 determines a plurality of additional query terms based on the plurality of characters, (operation 306). These additional query terms may be determined in any of a very wide variety of methods, and may have any of a wide variety of formats. For example, additional query terms may include the plurality of characters as a beginning of a complete query term, while other additional query terms may include query operators such as "NEAR", "AFTER", "WITHIN", or other such query operators.

Some additional query terms may include one or more characters pre-pended to the plurality of characters. Synonyms of the query term received from the user, along with synonyms of other additional query terms, may be used to generate further additional query terms. Other additional query terms may be based on words that sound the same, or similar to, other query terms or the plurality of characters. Also, stemming variations may be used to generate additional query terms. For example, if a user types in the additional characters "acc", "account" may be generated as an additional query term, and stemming variations such as "accounts" and "accounting" may be provided as additional query terms. Additional query terms may also be selected based on statistical information related to the set of records, or on syntactical information related to the set of records.

Other additional query terms may be based on their relation to the quantity of characters, the initial query term, or the additional query terms within a semantic network. This allows the selection of additional query terms that are semantically related to other terms within a language. Still other additional query terms may be based on an existing list. For example, a list of possible additional query terms may be searched with the plurality of characters, and all query terms containing the plurality of characters may be offered as additional query terms. Further additional query terms may be found within records in the database by using the plurality of characters to select a set of records from the database.

Computer system 110 then, for at least one of the plurality of additional query terms, processes at least a portion of the set of records to determine a relevance of the at least one of the plurality of additional query terms, (operation 308). This relevance may be determined using any of a very wide variety of methods. For example, a very simple measure of relevance may compare the set of records selected by the additional query term with the set of records selected by the initial query term. Such a relevance measure may be based on the similarities and differences of the two sets of records. Other measures of relevance may consider the location of the query term within a record, the clustering of query terms within a record, or the like. In some embodiments it may not be necessary to process the entire set of records. For example, the method may look at just a small part of each of the records in the set, or it may look at some, but not all, of the records in the set of records.

In some embodiments, the records may include metadata, and this meta data may be processed in determining the relevance of the at least one of the plurality of additional query terms. In further embodiments, each word in a record may be associated with a corresponding confidence factor. The confidence factor represents the accuracy of the translation of the word from audio to text. For example, a word that is easily detected and translated from audio data would have a higher confidence factor than a word that is mumbled or otherwise obscured in the audio data. These confidence factors may also be used in determining the relevance of the at least one of the plurality of additional query terms.

Some embodiments may apply operations 306 and 308 recursively. For example, a user may enter "cre" as the plurality of characters. A first pass through operations 306 and 308 may produce "credit" as an additional query term with high relevance. A second pass through operations 306 and 308 may produce "credit card" as an additional query term with high relevance. This determination of additional query terms and their relevance to the initial query term may occur multiple times within any given embodiment.

In a more complex example, if the user types in the additional characters "car", "card" may be generated as an additional query term, and "credit card" may then be selected as an additional query term based on the term "card." In another example, if the user types in the character "g", the word "go" may be generated as an additional query term, and additional processing based on "go" may result in "went" as an additional query term. In fact, it may be that "went" has a higher relevance than "go" and is a better selection for an additional query term. This sort of complex example is possible since the method may repeat any or all operations as desired, and the generation of additional query terms may use any or all of the wide variety of methods described herein.

Computer system 110 displays at least one of the plurality of additional query terms to the user for selection, (operation 310). Once the relevance of at least one of the additional query terms has been determined, at least one of the plurality of additional query terms is displayed to the user so that the user may select one or more of the plurality of additional query terms to be added to their database query. Optionally, these additional query terms may be ordered by relevance in their display to the user.

FIG. 4 is a flow diagram illustrating a method for automatically providing a plurality of additional database query terms to a user. Reference numbers from FIG. 4 are indicated parenthetically below. In this example, computer system 110 receives a query term from a user, (operation 400). Each record in the database comprises text data translated from audio data, such as from calls recorded by a contact center. Records may also include metadata, such as the date, time, and location of the call, the identities of the parties to the call, along with a wide variety of other information.

Computer system 110 then receives a plurality of characters from the user in addition to the query term, (operation 402). These additional characters may be the start of an additional query term that the user intends to use in searching the database. For example, if the user intends to enter the query term "credit WITHIN 5 OF card" the user starts by entering the characters "cre" into the system. Computer system 110 then uses these initial characters to suggest additional query terms, ideally including "credit WITHIN 5 OF card" to the user for selection.

Computer system 110 then selects a set of records from database 108 based on the database query, (operation 404). This selection may take a variety of forms. For example, computer system 110 may retrieve header information for each of the records, or it may retrieve each of the set of records for review by the user.

Computer system 110 determines a plurality of additional query terms based on the plurality of characters, (operation 406). These additional query terms may be determined in any of a very wide variety of methods, and may have any of a wide variety of formats. For example, additional query terms may include the plurality of characters as a beginning of a complete query term, while other additional query terms may include one or more characters pre-pended to the plurality of characters.

Computer system 110 then, for at least one of the plurality of additional query terms, processes at least a portion of the set of records to determine a relevance of the at least one of the plurality of additional query terms, (operation 408). This relevance may be determined using any of a very wide variety of methods. For example, a very simple measure of relevance may compare the set of records selected by the additional query term with the set of records selected by the initial query term. Such a relevance measure may be based on the similarities and differences of the two sets of records. Other measures of relevance may consider the location of the query term within a record, the clustering of query terms within a record, or the like. In some embodiments it may not be necessary to process the entire set of records. For example, the method may look at just a small part of each of the records in the set, or it may look at some, but not all, of the records in the set of records.

In some embodiments, the records may include metadata, and this meta data may be processed in determining the relevance of the at least one of the plurality of additional query terms. In further embodiments, each word in a record may be associated with a corresponding confidence factor. The confidence factor represents the accuracy of the translation of the word from audio to text. For example, a word that is easily detected and translated from audio data would have a higher confidence factor than a word that is mumbled or otherwise obscured in the audio data. These confidence factors may also be used in determining the relevance of the at least one of the plurality of additional query terms.

When one or more of the plurality of additional query terms is found in a stop list, or related to a term in a stop list, computer system 110 reduces the relevance of the corresponding query terms, (operation 410). In some examples, there may exist a quantity of possible query terms that are known to be of little value. These terms may be placed in a stop list so that if any of these query terms are considered as an additional query term, their relevance will be decreased so that they will be less likely to be selected for display to the user, and for use within the final query. For example, if "the" is part of a stop list, whenever "the" appears in a query term, the relevance of the query term is reduced. Thus, the query term "account" would have a higher relevance than the query term "the account", all other things being equal.

Computer system 110 displays at least one of the plurality of additional query terms to the user for selection, (operation 412). Once the relevance of at least one of the additional query terms has been determined, at least one of the plurality of additional query terms is displayed to the user so that the user may select one or more of the plurality of additional query terms to be added to their database query. Optionally, these additional query terms may be ordered by relevance in their display to the user.

When computer system 110 displays at least one of the plurality of additional query terms to the user for selection, it also displays the relevance of at least one of the plurality of additional query terms, (operation 414). This relevance may be displayed to the user using any of a wide variety of methods. For example, the relevance may be represented numerically, and a relevance number may be displayed to the user. Other examples may display relevance graphically, such as with a bar graph. Still other examples may indicate relevance by color, such as by displaying the plurality of additional query terms in a variety of different colors or intensities indicating their relevance.

Further examples may group the plurality of additional query terms according to their relevance. For example, highly relevant query terms may be grouped together, while less relevant query terms may comprise a second group. Still other groups may be based on stemming variants, synonyms, statistical term correlation, linguistic correlation, semantic correlation, or similar sounding terms. Linguistic correlation may be performed using Natural Language Processing (NLP), and semantic correlation may be performed using a semantic network. Note that semantic correlation is one type of linguistic correlation and a semantic network is one tool used in NLP.

FIG. 5 is an illustration of a user interface 500 in a system for automatically providing a plurality of additional database query terms to a user. This example user interface 500 of the computer system 110 is representative of the type of information that may be provided to a user, but any other interface may be used in other embodiments. In this example user interface 500, the "QUERY TERM" and the "ADDITIONAL CHARACTERS" are prominently displayed at the top of the screen. These two elements are shown as typed into input boxes by a user, however other embodiments may use other methods to receive the query term and plurality of additional characters from the user. Also, in actual operation, there may be multiple query terms. In other embodiments, the same text window may be used both for the query terms and for the additional characters.

In this simple example, three additional query terms have been displayed to the user for selection. "ADDITIONAL QUERY TERM 1" has been displayed along with the "RELEVANCE OF ADDITIONAL QUERY TERM 1". Below additional query term 1, "ADDITIONAL QUERY TERM 2" has been displayed along with the "RELEVANCE OF ADDITIONAL QUERY TERM 2". Below additional query term 1, "ADDITIONAL QUERY TERM 3" has been displayed along with the "RELEVANCE OF ADDITIONAL QUERY TERM 3". Other embodiments may use other user interfaces to communicate a plurality of additional query terms to a user, and to allow the user to select one or more of the additional query terms.

One should note that the flowcharts included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for automatically providing a plurality of additional database query terms to a user, the method comprising:
   receiving a first query term from the user;
   receiving a plurality of characters from the user, wherein the plurality of characters is only a portion of a second query term;
   selecting a first set of records from a database based on the first query term, wherein the database comprises records, and wherein the records comprise text translated from audio data associated with a call, wherein each word in a record is associated with a corresponding confidence factor, the confidence factor representing an accuracy of translation of the word from audio to text, the records further comprising metadata that includes information about a party to the call, a time of the call and a date of the call;
   determining, in a first pass, a first plurality of additional query terms based on the plurality of characters, wherein the first plurality of additional query terms are in a semantic network;
   for each one of the first plurality of additional query terms, determining a relevance of the additional query term with respect to the first plurality of additional query terms by processing all records in the database, including the metadata, to select a second set of records from the database based on the additional query term and comparing the second set of records with the first set of records selected based on the first query term, wherein the relevance is also determined at least in part based on semantic information related to the records;
   recursively determining, in at least a subsequent pass to the first pass, a second plurality of additional query terms based on previously determined additional query terms and determining the relevance of the recursively determined second plurality of additional query terms, wherein the relevance is determined at least in part based on semantic information related to the records;
   displaying at least one additional query term selected from the first plurality of additional query terms and the second plurality of additional query terms to the user for selection, the display based on the relevance of each of the plurality of additional query terms and on the confidence factor of each additional query term.

2. The method of claim 1 further comprising:
   displaying the relevance of the at least one of the plurality of additional query terms to the user.

3. The method of claim 1, wherein at least one of the plurality of additional query terms includes a query operator.

4. The method of claim 1, wherein at least one of the plurality of additional query terms includes one or more words pre-pended to the plurality of characters.

5. The method of claim 1, wherein the relevance is determined at least in part based on statistical information related to the set of records.

6. The method of claim 1, wherein the relevance is determined at least in part based on syntactic information related to the set of records.

7. The method of claim 1, wherein at least one of the plurality of additional query terms includes a synonym.

8. The method of claim 1, wherein at least one of the plurality of additional query terms includes a stemming variation.

9. The method of claim 1, wherein at least one of the plurality of additional query terms includes at least one word similar in sound to at least one word in the first query term or in the plurality of additional query terms.

10. The method of claim 1, wherein at least one of the plurality of additional query terms is selected from an existing list of query terms.

11. The method of claim 1, wherein at least one of the plurality of additional query terms is selected from records within the database.

12. The method of claim 1 further comprising:
    reducing the relevance of at least one of the plurality of additional query terms based on a stop list.

13. The method of claim 1, wherein displaying the at least one of the plurality of additional query terms to the user includes displaying the at least one of the plurality of additional query terms in an order of relevance.

14. A non-transitory computer-readable medium having instructions stored thereon for operating a computer system to automatically provide a plurality of additional database query terms to a user, wherein the instructions, when executed by the computer system, direct the computer system to:

receive a first query term from the user;

receive a plurality of characters from the user, wherein the plurality of characters is only a portion of a second query term;

select a first set of records from a database based on the first query term, wherein the database comprises records, and wherein the records comprise text translated from audio data associated with a call, wherein each word in a record is associated with a corresponding confidence factor, the confidence factor representing an accuracy of translation of the word from audio to text, the records further comprising metadata that includes information about a party to the call, a time of the call and a date of the call;

determine, in a first pass, a first plurality of additional query terms based on the plurality of characters, wherein the first plurality of additional query terms are in a semantic network;

for each one of the first plurality of additional query terms, determine a relevance of the additional query term with respect to the first plurality of additional query terms by processing all records in the database, including the metadata, to select a second set of records from the database based on the additional query term and comparing the second set of records with the first set of records selected based on the first query term, wherein the relevance is also determined at least in part based on semantic information related to the records;

recursively determine, in at least a subsequent pass to the first pass, a second plurality of additional query terms based on previously determined additional query terms and determining the relevance of the recursively determined second plurality of additional query terms, wherein the relevance is determined at least in part based on semantic information related to the records;

display at least one additional query term selected from the first plurality of additional query terms and the second plurality of additional query terms to the user for selection, the display based on the relevance of each of the plurality of additional query terms and on the confidence factor of each additional query term.

15. The non-transitory computer-readable medium of claim 14, wherein the instructions, when executed by the computer system, also direct the computer system to:

display the relevance of the at least one of the plurality of additional query terms to the user.

16. The non-transitory computer-readable medium of claim 14, wherein at least one of the plurality of additional query terms includes a query operator.

17. The non-transitory computer-readable medium of claim 14, wherein at least one of the plurality of additional query terms includes one or more words pre-pended to the plurality of characters.

\* \* \* \* \*